US006729168B2

(12) United States Patent
Hossain

(10) Patent No.: US 6,729,168 B2
(45) Date of Patent: May 4, 2004

(54) CIRCUIT FOR DETERMINING THE NUMBER OF LOGICAL ONE VALUES ON A DATA BUS

(75) Inventor: Razak Hossain, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 478 days.

(21) Appl. No.: 09/733,661

(22) Filed: Dec. 8, 2000

(65) Prior Publication Data

US 2002/0073127 A1 Jun. 13, 2002

(51) Int. Cl.[7] .................................................. G06F 7/50
(52) U.S. Cl. ......................................... 70/210; 708/709
(58) Field of Search ................................. 708/210, 709

(56) References Cited

U.S. PATENT DOCUMENTS 5,541,865 A * 7/1996 Ashkenazi .................. 708/210
5,978,827 A * 11/1999 Ichikawa .................... 708/709
6,578,063 B1 * 6/2003 Kojima et al. ............... 708/708
6,584,485 B1 * 6/2003 Aoki et al. .................. 708/708

* cited by examiner

Primary Examiner—David H. Malzahn
(74) Attorney, Agent, or Firm—William A. Munck; Lisa K. Jorgenson

(57) ABSTRACT

There is disclosed a circuit for determining the number of Logic 1 bits in a group of N data bits. The circuit comprises: 1) an input stage of 4:3 carry-save adders, each of the 4:3 carry-save adders receiving four of the N data bits on four input lines and generating three sum bits (S2, S1, S0) equal to a total number of Logic 1 bits on the four input lines, wherein the three sum bits have bit weights of S2=4, S1=2 and S0=1, respectively; 2) a first intermediate stage of 4:2 carry-save adders, each of the first intermediate stage 4:2 carry-save adders having four input lines for receiving selected ones of the S2 sum bits, the S1 sum bits, and the S0 sum bits and generating therefrom a carry-out (COUT) bit, a carry (C) bit and a sum (S) bit; and 3) a carry-propagate adder having a first input channel and a second input channel coupled to the first intermediate stage 4:2 carry-save adders and capable of generating a binary result equal to a total number of Logic 1 bits in the group of N data bits.

27 Claims, 3 Drawing Sheets

US 6,729,168 B2

CIRCUIT FOR DETERMINING THE NUMBER OF LOGICAL ONE VALUES ON A DATA BUS

CROSS-REFERENCE TO RELATED APPLICATION

The present invention is related to that disclosed in U.S. patent application Ser. No. 09/733,130, filed Dec. 8, 2000, entitled "CIRCUIT FOR DETECTING NUMBERS EQUAL TO A POWER OF TWO ON A DATA BUS." The above application is commonly assigned to the assignee of the present invention. The disclosure of this related patent application is hereby incorporated by reference into the present disclosure as if fully set forth herein.

TECHNICAL FIELD OF THE INVENTION

The present invention is directed, in general, to data processors and, more specifically, to a circuit that counts the number of Logic 1 bits on a bus in a data processor.

BACKGROUND OF THE INVENTION

The demand for high performance computers and communication devices requires that state-of-the-art digital signal processors (DSPs) and general purpose microprocessors, such as x86 based microprocessors, execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

Pipelining refers to the simultaneous processing of multiple instructions in the pipeline. For example, if a processor executes each instruction in five stages and each stage requires a single clock cycle to perform its function, then five separate instructions can be processed simultaneously in the pipeline, with the processing of one instruction completed during each clock cycle. Hence, the instruction throughput of an N stage pipelined architecture is, in theory, N times greater than the throughput of a non-pipelined architecture that completes only one instruction every N clock cycles. However, the speed improvements provided by pipeline architectures and superpipelining processing are ultimately limited by speed at which the individual stages in the pipeline execute. It is therefore important to minimize the time required to execute each part of an instruction.

Mathematical operations often incur substantial time delays in calculating a value. Counting the number of Logic 1 bits on a data bus or in a data register is a common operation encountered in computer instruction sets (e.g., ST20C2 Core Instruction Set Reference Manual, SGS-Thomson Microelectronics, November 1997) and as a component function in various digital blocks, such as memory interface units (e.g., N. J. Richardson, Private Communication). The function can serve a number of different purposes, including determining the number of valid bits set in some control logic and performing a simple error detection operation. The input to such a function is an n-bit wide bus (or the output of an n-bit data register) in which an arbitrary number of bits are set to a Logic 1 value and the other bits are set to a Logic 0 value. The output for this function is a $\log_2(n)$ bit binary number equal to the number of ones on the input bus.

The problem of counting the number of ones on a bus is a simplified analog to the compression tree in a multiplier. Writing the numbers to be added as a vertical row, it is observed that the numbers represent a single column of a multiplier. Designing large multipliers is a well-known problem in digital design (See D. Goldberg, *Appendix A: Computer Arithmetic* in *Computer Architecture—A Quantitative Approach*, by J. L. Hennessy and D. A. Patterson, Second Edition, Morgan Kaufmann Publishers Inc., San Francisco, Calif., 1996. See also I. Koren, *Computer Arithmetic Algorithms*, Prentice Hall, Englewood Cliffs, N.J., 1993).

The procedure for completing the multiplication operation involves two steps. On the first step, the partial products terms are compressed to two terms. This can be done using a number of different compression schemes, including Booth encoding and various trees of full adders, 4:2 carry-save adders (CSA42s), 5:3 carry-save adders (CSA53s), 7:3 carry-save adders (CSA73s), and the like. With two partial products, the final result of the multiplication operation is calculated using a carry-propagate adder (CPA) Again, there is a large literature on the optimum design of adders, including carry-select adders, carry look-ahead adders, and the like.

Because the problem of counting the number of Logic 1 bits on a data bus is such a common operation encountered in computer instruction sets, it is important to minimize the execution time of such an operation. However, as the bus grows larger, more stages of adders are required to perform the count and more propagation delays are encountered.

Therefore, there is a need in the art for data processors that minimize the execution time of common mathematical operations. In particular, there is a need for a circuit capable of rapidly determining the number of Logic 1 bits on a bus in a microprocessor, memory interface, or other data processing device. More particularly, there is a need for a Logic 1 bit counting circuit that minimizes the number of stages required to count Logic 1 bits on a data bus.

SUMMARY OF THE INVENTION

The present disclosure uses the following abbreviations and definitions to designate adder cells:

1. HA—Half adder. A half adder adds two input bits and provides the result as a two bit output, generally called sum (S) and carry (C). Carry has a weight of 2 and sum has a weight of 1.

2. CSA32—Full adder. A full adder that counts three input bits and provides the result (i.e., the number of Logic 1 bit) as a two bit output. The outputs are generally called the sum and carry, with the carry having a weight of 2 and the sum of 1.

3. CSA42—4:2 carry-save adder. A 4:2 carry-save adder is a 4-to-2 (4:2) compressor circuit that adds the result of five input bits (four regular bits and a carry-in (CIN) bit) and produces three output bits (a carry bit and a sum bit, and a carryout (COUT) bit) for the result. The COUT bit has a weight of 2, the carry bit has a weight of 2, and the sum bit has a weight of 1.

4. CSA53—5:3 carry-save adder. A 5:3 carry-save adder is a 5-to-3 compressor circuit that adds five input bits, three of which have bit weights of 1 and two of which have bit weights of 2. The three output bits have bit weights of 4, 2 and 1.

5. CSA73—7:3 carry-save adder. A 7:3 carry-save adder is a 7-to-3 compressor circuit that counts seven input bits, each having a bit weight of 1. The three outputs bits have bit weights of 4, 2, and 1.

6. CPA—Carry-propagate adder. An adder circuit that gives the binary result of adding two binary numbers.

7. CSA43—4:3 carry-save adder. A 4:3 carry-save adder is a 4-to-3 compressor circuit that adds four input bits and provides three outputs (S2, S1, and S0) having bit weights of 4, 2 and 1, respectively. This compressor is not efficient for general purpose multiplication, but is one of a family of compressors, introduced in the present application (along with the CSA63 and CSA84), shown to have advantages when used to count the number of Logic 1 bits on a bus.

8. CSA63—6:3 carry-save adder. A 6:3 carry-save adder is a 6-to-3 compressor circuit that adds six equally weighted input bits and produces three output bits with weights of 4, 2, and, 1, respectively.

9. CSA84—8:4 carry-save adder. An 8:4 carry-save adder is an 8-to-4 compressor circuit with adds eight equally weighted input bits. The output bits have weights of 8, 4, 2 and 1, respectively.

To address the above-discussed deficiencies of the prior art, it is a primary object of the present invention to provide a circuit for determining the number of Logic 1 bits in a group of N data bits. According to an advantageous embodiment, the circuit for determining the number of Logic 1 bits comprises: 1) an input stage of 4:3 carry-save adders, each of the 4:3 carry-save adders receiving four of the N data bits on four input lines and generating three sum bits (S2, S1, S0) equal to a total number of Logic 1 bits on the four input lines, wherein the three sum bits have bit weights of S2=4, S1=2 and S0=1, respectively; 2) a first intermediate stage of 4:2 carry-save adders, each of the first intermediate stage 4:2 carry-save adders having four input lines for receiving selected ones of the S2 sum bits, the S1 sum bits, and the S0 sum bits and generating therefrom a carry-out (COUT) bit, a carry (C) bit and a sum (S) bit; and 3) a carry-propagate adder having a first input channel and a second input channel coupled to the first intermediate stage 4:2 carry-save adders and capable of generating a binary result equal to a total number of Logic 1 bits in the group of N data bits.

According to one embodiment of the present invention, N equals 16 and the input stage comprises four 4:3 carry-save adders.

According to another embodiment of the present invention, the intermediate stage comprises three 4:2 carry-save adders.

According to still another embodiment of the present invention, N equals 32 and the input stage comprises eight 4:3 carry-save adders.

According to yet another embodiment of the present invention, the circuit for determining the number of Logic 1 bits further comprises a second intermediate stage of 4:2 carry-save adders, each of the second intermediate stage 4:2 carry-save adders having four input lines for receiving selected ones of the COUT bits, the C-bits, and the S-bits from the first intermediate stage 4:2 carry-save adders.

According to a further embodiment of the present invention, the first and second input channels of the carry-propagate adder are coupled to outputs of the second intermediate stage 4:2 carry-save adders.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
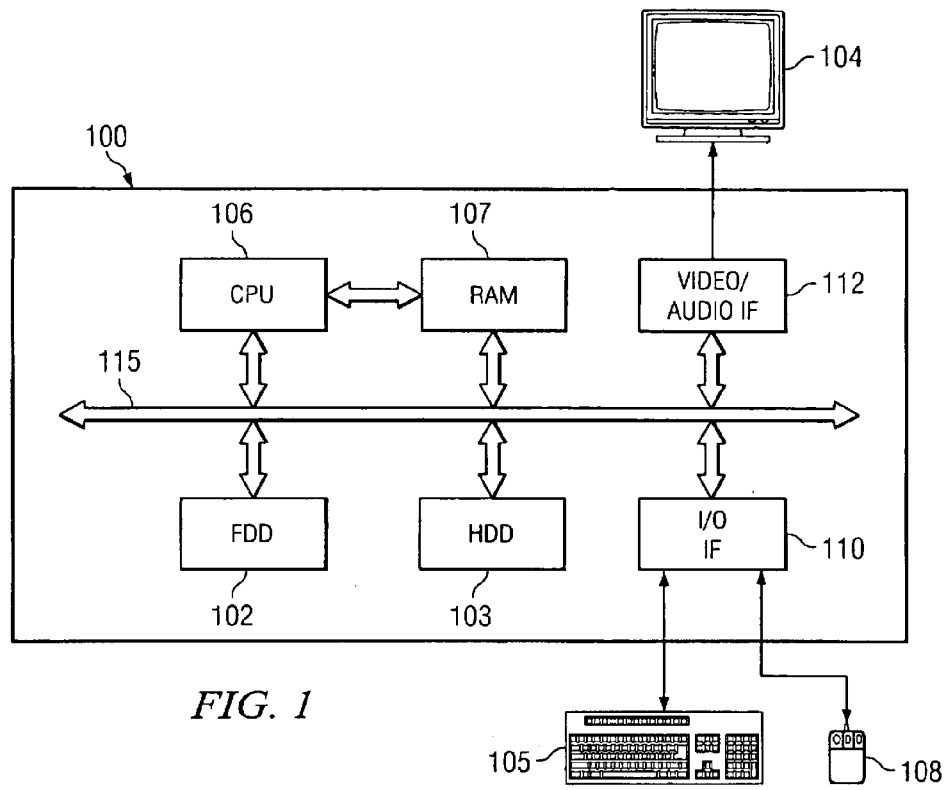
FIG. 1 illustrates an exemplary processing system, namely a personal computer, that implements an improved Logic 1 counter in accordance with the principles of the present invention.

FIG. 1 illustrates an exemplary processing system, namely personal computer (PC) 100, that contains an improved Logic 1 counter in accordance with the principles of the present invention. Personal computer 100 comprises removable (i.e., floppy) disk drive (FDD) 102 and hard disk drive (HDD) 103, monitor 104, keyboard 105, processor (CPU) 106, main memory 107, and a pointing device, such as mouse 108. Monitor 104, keyboard 105, and mouse 108 may be replaced by, or combined with, other input/output (I/O) devices. Removable disk drive 102 is capable of reading and writing to removable floppy diskettes. Hard disk drive 105 provides fast access for storage and retrieval of application programs and data.

Keyboard 105 and mouse 108 are coupled to PC 100 via input/output (I/O) interface (IF) 110. Monitor 104 is coupled to PC 100 via video/audio interface (IF) 112. The internal components of PC 100, including floppy disk drive 102, hard disk drive 103, processor 106, main memory 107, I/O interface 110 and video/audio interface 112, are coupled to and communicate across communications bus 115.

In an exemplary embodiment of the present invention, main memory 107 comprises a volatile storage device, such as a dynamic random access memory (PAM). Processor 106 may comprise an on-board two level cache system, including a Level 1 (L1) cache and a Level 2 (L2) cache. The two level cache is a system in which a small, fast cache (the L1 cache) is connected to a slower, larger cache (the L2 cache). When the central processing unit (CPU) core logic of processor 106 reads or writes data to or from a memory location in main memory 107, the cache system first tests to see if the data belonging to that location is in the L1 cache. If the data is in the L1 cache, then the data is provided or updated quickly by the L1 cache. If the data is not in the L1 cache, then an L1 cache read "miss" or an L1 cache write "miss" has occurred.

The data is then provided or updated to the CPU core logic of processor 106 by the L2 cache. In the case of an L1 cache read miss, the line containing the requested data is also transferred from the L2 cache to the L1 cache, so that the data may be provided more quickly the next time processor 106 accesses the data. This is known as an L1 cache line fill. If the data is also not in the L2 cache, then an L2 cache miss has occurred and the line containing the requested data is fetched from main memory 107 and then loaded into the L2 cache for faster access the next time the data is requested. This is known as an L2 cache line fill.

Figure 2:
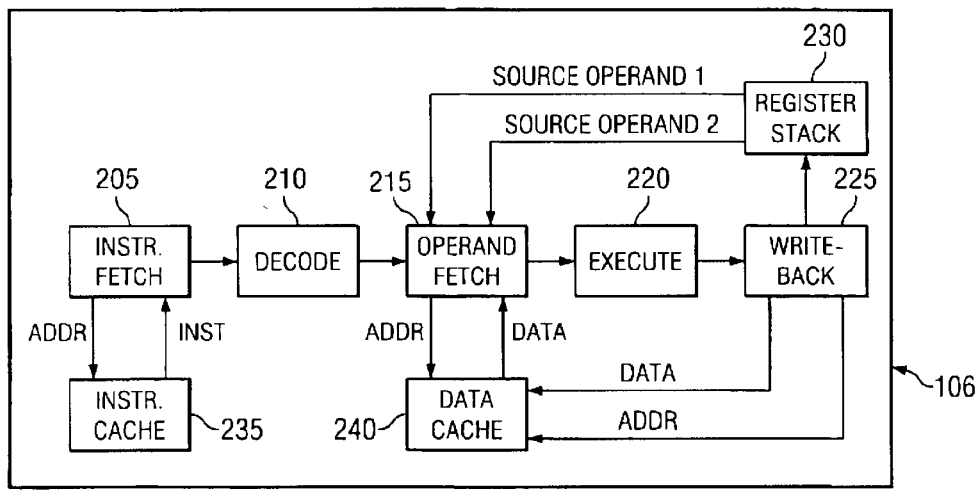
FIG. 2 illustrates in greater detail an exemplary processor according to one embodiment of the present invention.

FIG. 2 illustrates in greater detail exemplary processor 106 according to one embodiment of the present invention. Processor 106 contains an instruction pipeline comprising instruction fetch (IF) stage 205, decode stage 210, operand fetch stage 215, execute stage 220, and write-back stage 225. Processor 106 also comprises register stack 230, instruction (INSTR.) cache 235 and data cache 240.

Processor 106 is a central processing unit (CPU) capable of fetching and interpreting instructions, retrieving data, executing instructions, and storing results. The illustrated instruction pipeline is a mechanism capable of executing several different operations concurrently. The pipeline does this by breaking down the processing steps for each major task into several discrete processing phases, each of which is executed by a separate pipeline stage. Each task must pass sequentially through each processing phase, and hence each pipeline stage, to complete its execution.

Instruction fetch stage 205 fetches instructions to be executed from instruction cache 235 and stores the fetched instructions in an instruction fetch buffer (IFB). The instructions taken from the IFB by decode stage 210 are encoded in a highly compact form. Decode stage 210 decodes the instructions into larger sets of signals that can be used directly for execution by subsequent pipeline stages. Operand fetch stage 215 fetches operands from memory or from register stack 230. Execute stage 220 performs the actual operation (e.g., add, multiply, divide, and the like) on the operands fetched by operand fetch stage 215 and generates the result. Write-back stage 225 writes the result generated by execute stage 220 into data cache 240 or into one of the registers in register stack 230.

As noted above, it is important to minimize the time required to execute each part of an instruction. In exemplary processor 106, there are a number of data buses and address buses interconnecting the functional blocks within processor 106. Many programs contain instructions that count the number of Logic 1 bits on a data bus or in a data register, either for status purposes, or error checking purposes, or the like. However, as noted above, counting the number of Logic 1 bits on a data bus (or data register) is a mathematical operation that may cause undue delay if the circuit that counts the Logic 1 bits is not efficiently constructed in order to minimize the number of gate delays (i.e., stages).

The present invention determines the number of Logic 1 bits on a bus (address or data) or in a register using a novel set of compressors. The present invention significantly simplifies the process of compressing the partial product terms. The resulting solution is faster, and also generally smaller and more power efficient solution than conventional solutions to the problem of determining the number of Logic 1 bits on an address or data bus, or in a data register. For purposes of simplicity and clarity, the following discussion will be focused on counting the number of Logic 1 bits on a data bus, rather than in a data register. However, it will be understood that the invention disclosed below may easily be adapted to count the number of Logic 1 bits in ad data register.

According to the principles of the present invention, the encoding scheme involves dividing the input bus into M segments each of which are N-bits wide. A first stage of logic circuits is used to count the number of Logic 1 bits in each of these N-bit segments. Usually, N is chosen as a multiple of 4 (e.g., 8, 16, 24, 32, and the like). While this is similar to how a traditional multiplier compressor works, the fact that the first stage of compressors work on data bits that are only a single bit wide (i.e., bit weight of 1) permits the subsequent use of compressors that generally are not favored in multipliers.

This is due to the fact that the first stage of compressors do not need to consider the compression ratio being proportional to the number of output bits. In regular multiplication, when, for example, a 4:2 carry-save adder (CSA42) gate is used in a stage, the output data is 2 bits wide. This ensures that the compression that occurs is 4 to 2 (i.e., 2-to-1 ratio). In a CSA42, there is also a carry-in (CIN) bit and carry-out (COUT) bit which are used by other gates in the same stage. Since these bits are internally generated in the row and are not available as inputs or outputs, they are not included in the compression ratio calculation.

This problem does not occur when adding data one bit wide, as there are no other rows of data which need to be tiled. Standard multiplier compressors are designed to accommodate the wide data widths present in a multiplication operation. In a one bit counter, the first compression that occurs is always down to a single bus. Thus, a CSA42 compressor actually performs compression of 4-to-1 for the first compression. After the first compression is completed, the partial products are now of width greater than one. Under these conditions, the usual compression schemes for multipliers needs to be utilized.

Another advantage of having data being one bit wide is that there are no carry-in bits. This permits the reduction of the amount of computation relative to compressors with carry-in bits. Since the first compression allows for maximum compression, there are some advantages to be garnered by making the first compressor as wide as possible. For example, a four input CSA43 may be used. For traditional multipliers, a compressor that receives 4 bits, but which gives a meager compression ration of 4/3=1.33, is a worse compressor than a common full adder (CSA32), and would never be used.

In general, it is advantageous to use large compressors up front. For example, a CSA84 which gives the four bit result of adding the eight inputs can be used to perform an initial 8 to 1 compression. For standard partial product compression, a CSA84 has no advantage over a CSA42 in terms of compression ration, and due to the extra circuit complexity would not be used. However, in the present invention, a CSA84 serves a very advantageous task. Other useful compressor sizes for the initial compression would be a CSA63, which takes six inputs and compresses them to three outputs.

The present invention uses novel compressors for the first stage of the compression tree and then uses standard compression circuits in subsequent stages. To demonstrate the advantages of the present invention, a prior art counter for counting Logic 1 bits on a 16-bit bus is compared to a 16-bit bus counter according to the principles of the present invention. In the prior art counter, a first stage of CSA42 adders is used. The actual optimal implementation for a particular technology may or may not use CSA42 gates, since it is dependent on the width of the data bus and the delay characteristics of the technology. The example is, however, used to demonstrate the general superiority of the present invention, irrespective of the actual compression scheme used for the partial products of width greater than 1.

Figure 3:
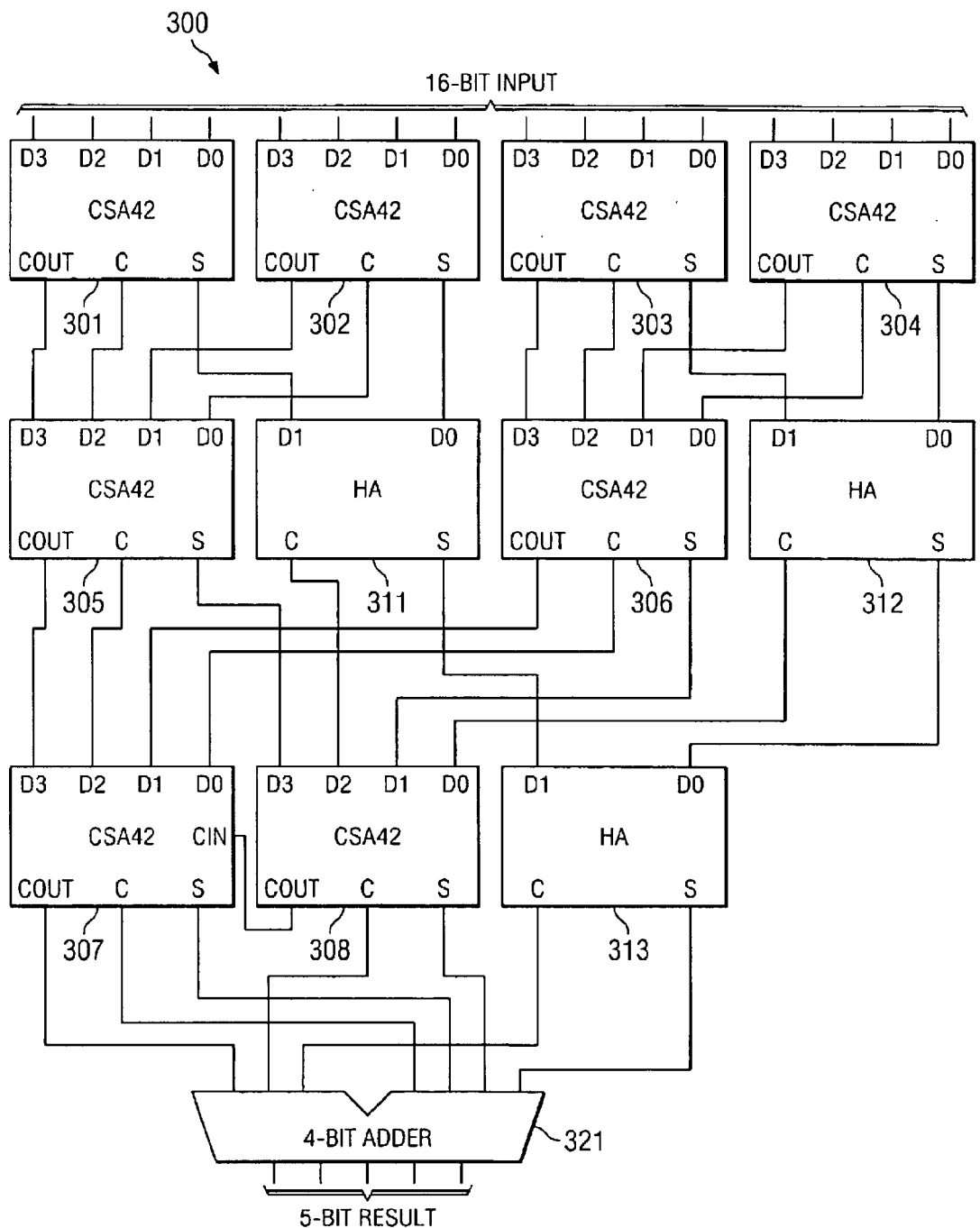
FIG. 3 illustrates a Logic 1 counter for counting Logic 1 bits on a 16-bit bus (or in a 16-bit register) according to one embodiment of the prior art.

FIG. 3 illustrates Logic 1 counter 300 for counting Logic 1 bits on a 16-bit bus according to one embodiment of the prior art. Logic 1 counter 300 comprises four stages of adders. A first stage comprises four 4:2 carry-save adders, namely CSA42 301, CSA42 302, CSA42 303 and CSA42 304. A second stage comprises two 4:2 carry-save adders, namely CSA42 305 and CSA42 306, and two half adders, namely HA 311 and HA 312. A third stage comprises two 4:2 carry-save adders, namely CSA42 307 and CSA42 308, and a half adder, namely HA 313. The fourth stage is 4-bit carry-propagate adder (CPA) 321, which receives a 3-bit argument on a first 4-bit input and a second 4-bit argument on a second 4-bit input. The sum of the two arguments is a five bit result at the output of 4-bit adder 321.

In the prior art circuit, a tree of CSA42 cells is used to compress the 16 bits received from a bus to a sum and carry term. In the first stage, four CSA42 cells operate in parallel and reduce the number of partial products to eight. The reason there are eight partial product terms is that each CSA42 cell produces a carry bit and a carry-out bit, both of which have weights of 2. Since we have four CSA42 cells, we have eight terms of the same weight. The second stage uses two CSA42 cells and two HA cells in parallel to reduce to four partial products.

The third stage uses two CSA42 cells and one HA cell to produce two 4-bit outputs. The final addition uses a 4-bit CPA with a carry-out bit. In some fabrication processes, the delay of a CSA42 cell is typically 0.72 nanoseconds and the delay of a CPA adder is typically 0.77 nanoseconds. Since the critical path in Logic 1 counter 300 is three CSA42 cells followed by a 4-bit CPA, the total delay is 2.93 nanoseconds (0.72+0.72+0.72+0.77).

Figure 4:
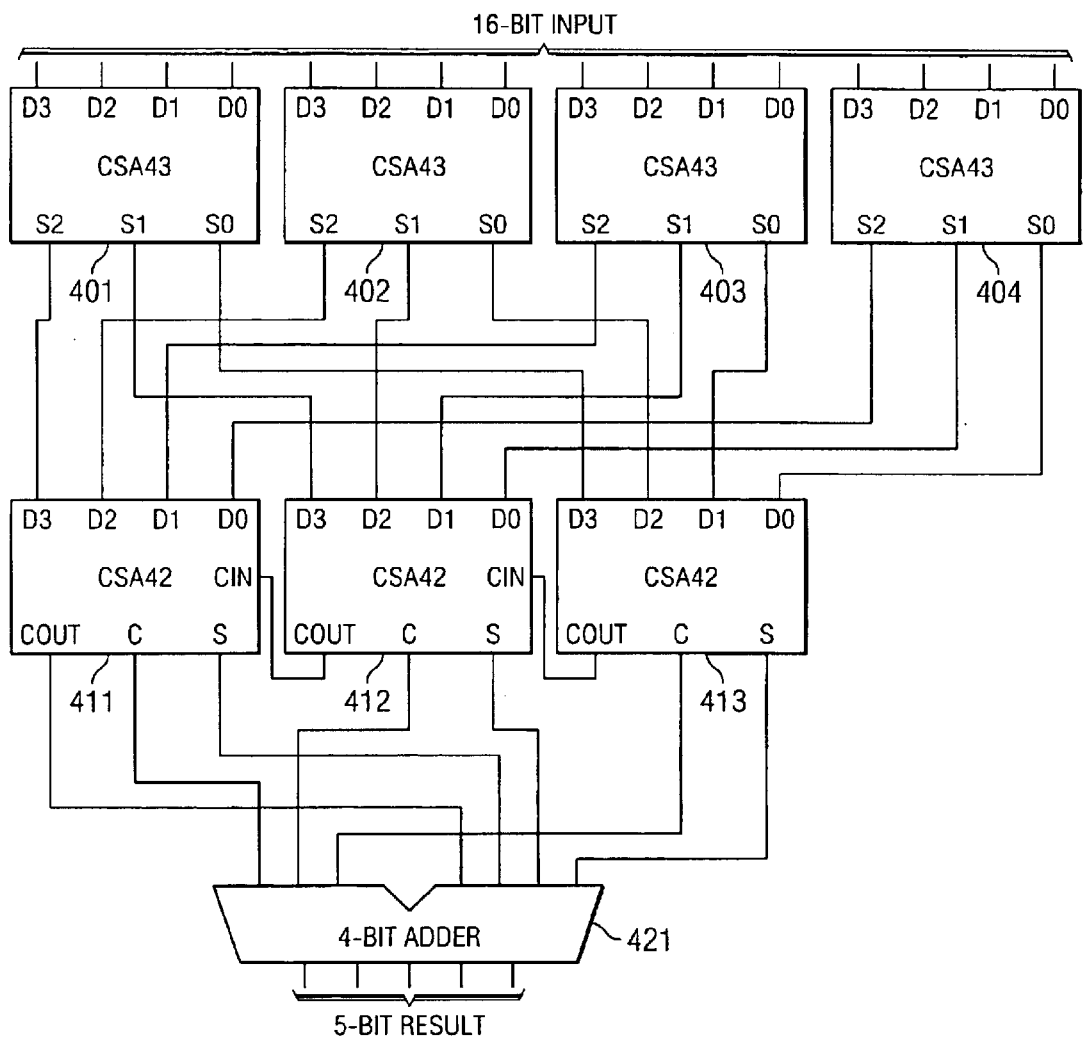
FIG. 4 illustrates a Logic 1 counter for counting Logic 1 bits on a 16-bit bus (or in a 16-bit register) according to one embodiment of the present invention.

FIG. 4 illustrates Logic 1 counter 400 for counting Logic 1 bits on a 16-bit bus according to one embodiment of the present invention. Logic 1 counter 400 comprises three stages of adders. A first stage comprises four 4:3 carry-save adders, namely CSA43 401, CSA43 402, CSA43 403 and CSA43 404. A second stage comprises three 4:2 carry-save adders, namely CSA42 411, CSA42 412, and CSA42 413. The third stage is 4-bit carry-propagate adder (CPA) 421, which receives a 3-bit argument on a first 4-bit input and a second 4-bit argument on a second 4-bit input. The sum of the two arguments is a 5-bit result at the output of 4-bit CPA 421.

By using four CSA43 cells for the first stage, it is possible to reduce the sixteen partial products to four. In the second stage, three CSA42 cells operate in parallel to reduce the result to two partial products. A 4-bit CPA cell generates the final result. A synthesized CSA43 cell has a delay of 0.48 nanoseconds in some fabrication processes. Logic 1 counter 400 has a critical path of one CSA43 cell, one CSA42 cell, and one 4-bit CPA. This equals a total delay of 1.97 nanoseconds (0.48+0.72+0.77), which is faster that the prior art counter. The design uses four CSA43 cells and three CSA42 cells compared to eight CSA42 cells and two HA adders in the prior art design. Since the CSA43 cell has approximately the same complexity as a CSA42 cell, the new design is also smaller and consumes less power.

Alternately, Logic 1 counter 400 could have been implemented with full adders (or CSA32 cells) and half adders. For a prior art implementation with those cells, the first stage would use four CSA32 cells and one HA cells in parallel. The second stage would use two CSA32 cells and two HA cells. The third stage of compression would use one CSA32 cell and two HA cells. The fourth and final stage would need one CSA32 cell and one HA cell. Finally a 4-bit CPA would be needed to complete the function. The critical path would thus be four CSA32 cells and a 4-bit carry-propagate adder. A typical CSA32 cell has a delay of 0.32 nanoseconds. Thus, the full delay is 2.05 nanoseconds.

On the other hand, using CSA43 cells in the first stage according to the principles of the present invention, the first stage compression could be performed with four CSA43 cells. The second stage would use four CSA32 cells. The third stage would need two CSA32 cells and one HA cell before passing the result on to the 4-bit CPA. The critical path in this case is one CSA43 cell, two CSA32 cells, and the CPA, which give a delay of 1.89 nanoseconds. Again, the use of the new first stage compressor results in a faster implementation. In terms of cell count, the pure CSA32 solution requires eight CSA32 cells, six HA cells, and a 4-bit CPA. The solution according to the present invention using CSA43 cells needs four CSA43 cells, six CSA32 cells, one HA cell and a 4-bit CPA.

The two examples in the previous subsection show speed-ups of 36% and 8% in using the CSA43 compressor for counting the number of Logic 1 bits on a bus. The actual speed improvements vary depending on the bus width, the fabrication technology, and the compression scheme being used.

In addition to the CSA43 cell described herein, the CSA63 cell and the CSA84 cell are also useful in the first compression stage. In an exemplary 16-bit bus embodiment, three CSA63 cells or two CSA84 cells may be used in the first stage in place of the four CSA43 cells. Furthermore, as the size of the bus expands to 32-bits or 64-bits, or greater, the present invention may be expanded by adding in additional intermediate stages of 4:2 carry-saver adders after the input stage of CSA43, CSA63, or CSA84 cells. For example, the number of Logic 1 bits on a 32-bit bus may be counted by using an input stage of eight CSA43 cells (or six CSA63 cells or four CSA84 cells), two intermediate stages of CSA42 cells, and a final carry-propagate adder.

In general, one can extend the result to a CSApq cell, where p input bits are compressed to q output bits. The basic result of the present invention is that for the first compression stage of an application where the partial products have a width of one, the actual compression achieved is p/1 and not p/q. Thus, a whole host of p values and q values can be used which would not necessarily be of any advantage in regular multiplication where the partial product widths are always greater than 1.

Although the present invention has been described in detail, those skilled in the art should understand that they can make various changes, substitutions and alterations herein without departing from the spirit and scope of the invention in its broadest form.

What is claimed is:

1. A circuit for determining the number of Logic 1 bits in a group of N data bits comprising:

an input stage of 4:3 carry-save adders, each of said 4:3 carry-save adders receiving four of said N data bits on four input lines and generating three sum bits (S2, S1, S0) equal to a total number of Logic 1 bits on said four input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit; and a carry-propagate adder having a first input channel and a second input channel coupled to said first intermediate stage 4:2 carry-save adders and capable of generating a binary result equal to a total number of Logic 1 bits in said group of N data bits.

2. The circuit for determining the number of Logic 1 bits as set forth in claim 1 wherein N equals 16 and said input stage comprises four 4:3 carry-save adders.

3. The circuit for determining the number of Logic 1 bits as set forth in claim 2 wherein said intermediate stage comprises three 4:2 carry-save adders.

4. The circuit for determining the number of Logic 1 bits as set forth in claim 1 wherein N equals 32 and said input stage comprises eight 4:3 carry-save adders.

5. The circuit for determining the number of Logic 1 bits as set forth in claim 4 further comprising a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders.

6. A circuit for determining the number of Logic 1 bits in a group of N data bits comprising:

an input stage of 6:3 carry-save adders, each of said 6:3 carry-save adders receiving six of said N data bits on six input lines and generating three sum bits (S2, S1, S0) equal to a total number of Logic 1 bits on said six input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit; and a carry-propagate adder having a first input channel and a second input channel coupled to said first intermediate stage 4:2 carry-save adders and capable of generating a binary result equal to a total number of Logic 1 bits in said group of N data bits.

7. The circuit for determining the number of Logic 1 bits as set forth in claim 6 wherein N equals 16 and said input stage comprises three 6:3 carry-save adders.

8. The circuit for determining the number of Logic 1 bits as set forth in claim 7 wherein said intermediate stage comprises three 4:2 carry-save adders.

9. The circuit for determining the number of Logic 1 bits as set forth in claim 6 wherein N equals 32 and said input stage comprises six 6:3 carry-save adders.

10. The circuit for determining the number of Logic 1 bits as set forth in claim 9 further comprising a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders.

11. A circuit for determining the number of Logic 1 bits in a group of N data bits comprising:

an input stage of 8:4 carry-save adders, each of said 8:4 carry-save adders receiving eight of said N data bits on eight input lines and generating four sum bits (S3, S2, S1, S0) equal to a total number of Logic 1 bits on said eight input lines, wherein said four sum bits have bit weights of S3=8, S2=4, S1=2 and S0=4, respectively;

a first intermediate stage of 4.2 carry-save adders, each of said first intermediate stage 4.2 carry-save adders having four input lines for receiving selected ones of said S3 sum bits, said S2 sum bits, said S1 sum bits, and said S0 sum bits and generating therefrom a carry-out (COUT) bit, a carry (C) bit and a sum (S) bit; and a carry-propagate adder having a first input channel and a second input channel coupled to said first intermediate stage 4:2 carry-save adders and capable of generating a binary result equal to a total number of Logic 1 bits in said group of N data bits.

12. The circuit for determining the number of Logic 1 bits as set forth in claim 11 wherein N equals 16 and said input stage comprises two 8:4 carry-save adders.

13. The circuit for determining the number of Logic 1 bits as set forth in claim 12 wherein said intermediate stage comprises two 4:2 carry-save adders.

14. The circuit for determining the number of Logic 1 bits as set forth in claim 11 wherein N equals 32 and said input stage comprises four 8:4 carry-save adders.

15. The circuit for determining the number of Logic 1 bits as set forth in claim 14 comprising a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders.

16. A data processor comprising:

an instruction execution pipeline comprising N processing stages, each of said N processing stages capable of performing one of a plurality of execution steps associated with a pending instruction being executed by said instruction execution pipeline, wherein at least one of said N processing stages comprises a counting circuit for determining the number of Logic 1 bits in one of a N-bit data bus and a N-bit register in said data processor, said counting circuit comprising:

an input stage of 4:3 carry-save adders, each of said 4:3 carry-save adders receiving four of said N data bits on four input lines and generating three sum bits (S2, S1, S0) equal to a total number of Logic 1 bits on said four input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit; and a carry-propagate adder having a first input channel and a second input channel coupled to said first intermediate stage 4:2 carry-save adders and capable of generating a binary result equal to a total number of Logic 1 bits in said group of N data bits.

17. The data processor as set forth in claim 16 wherein N equals 16 and said input stage comprises four 4:3 carry-save adders.

18. The data processor as set forth in claim 17 wherein said intermediate stage comprises three 4:2 carry-save adders.

19. The data processor as set forth in claim 16 wherein N equals 32 and said input stage comprises eight 4:3 carry-save adders.

20. The data processor as set forth in claim 19 further comprising a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders.

21. A circuit for determining the number of Logic 1 bits in a group of N data bits comprising:

an input stage of 4:3 carry-save adders, each of said 4:3 carry-save adders receiving four of said N data bits on four input lines and generating three sum bits (S2, S1, S0) equal to a total number of Logic 1 bits on said four input lines, wherein said three sum bits have bit weights of S2=4, S1=2 and S0=1, respectively;

a first intermediate stage of compressors, each of said first intermediate stage compressors receiving selected ones of said S2 sum bits, said S1 sum bits, and said S0 sum bits and generating therefrom a reduced number of output bits equal to a total number of Logic 1 bits on said selected S2 sum bits, said selected S1 sum bits, and selected S0 sum bits; and a carry-propagate adder having a first input channel and a second input channel coupled to said first intermediate stage compressors and capable of generating a binary result equal to a total number of Logic 1 bits in said group of N data bits.

22. A circuit for determining the number of Logic 1 bits in a group of N data bits comprising:

an input stage of 6:3 carry-save adders, each of said 6:3 carry-save adders receiving six of said N data bits on six input lines and generating three sum bits (S2, S1, S0) equal to a total number of Logic 1 bits on said six input lines, wherein said three sum bits have bit weights of S2=4, S1=2 and S0=1, respectively;

a first intermediate stage of compressors, each of said first intermediate stage compressors receiving selected ones of said S2 sum bits, said S1 sum bits, and said S0 sum bits and generating therefrom a reduced number of output bits equal to a total number of Logic 1 bits on said selected S2 bits, said selected S1 bits, and said selected S0 bits; and a carry-propagate adder having a first input channel and a second input channel coupled to said first intermediate stage compressors and capable of generating a binary result equal to a total number of Logic 1 bits in said group of N data bits.

23. A circuit for determining the number of Logic 1 bits in a group of N data bits comprising:

an input stage of 8:4 carry-save adders, each of said 8:4 carry-save adders receiving eight of said N data bits on eight input lines and generating four sum bits (S3, S2, S1, S0) equal to a total number of Logic 1 bits on said eight input lines, wherein said four sum bits have bit weights of S3=8, S2=4, S1=2 and S0=1, respectively;

a first intermediate stage of compressors, each of said first intermediate stage compressors receiving selected ones of said S3 sum bits, said S2 sum bits, said S1 sum bits, and said S0 sum bits and generating therefrom a reduced number of output bits equal to a total number of Logic 1 bits on said selected S3 bits, said selected S2 bits, said selected S1 bits, and said selected S0 bits; and a carry-propagate adder having a first input channel and a second input channel coupled to said first intermediate stage compressors and capable of generating a binary result equal to a total number of Logic 1 bits in said group of N data bits.

24. A circuit for determining the number of Logic 1 bits in a group of 32 data bits comprising:

an input stage comprising eight 4:3 carry-save adders, each of said 4:3 carry-save adders receiving four of said N data bits on four input lines and generating three sum bits (S2, S1, S0) equal to a total number of Logic 1 bits on said four input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit;

a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders; and a carry-propagate adder having a first input channel and a second input channel coupled to said second intermediate stage 4:2 carry-save adders and capable of generating a binary result equal to a total number of Logic 1 bits in said group of 32 data bits.

25. A circuit for determining the number of Logic 1 bits in a group of 32 data bits comprising:

an input stage comprising six 6:3 carry-save adders, each of said 6:3 carry-save adders receiving six of said N data bits on six input lines and generating three sum bits (S2, S1, S0) equal to a total number of Logic 1 bits on said six input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit;

a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders; and a carry-propagate adder having a first input channel and a second input channel coupled to said second intermediate stage 4:2 carry-save adders and capable of generating a binary result equal to a total number of Logic 1 bits in said group of 32 data bits.

26. A circuit for determining the number of Logic 1 bits in a group of 32 data bits comprising:

an input stage comprising four 8:4 carry-save adders, each of said 8:4 carry-save adders receiving eight of said N data bits on eight input lines and generating four sum bits (S3, S2, S1, S0) equal to a total number of Logic 1 bits on said eight input lines, wherein said four sum bits have bit weights of S3=8, S2=4, S1=2 and S0=1, respectively;

a first intermediate stage of 4:2 carry-save adders, each of said first intermediate stage 4.2 carry-save adders having four input lines for receiving selected ones of said S3 sum bits, said S2 sum bits, said S1 sum bits, and said S0 sum bits and generating therefrom a carry-out (COUT) bit, a carry (C) bit and a sum (S) bit;

a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders; and a carry-propagate adder having a first input channel and a second input channel coupled to said second intermediate stage 4:2 carry-save adders and capable of generating a binary result equal to a total number of Logic 1 bits in said group of 32 data bits.

27. A data processor comprising:

an instruction execution pipeline comprising 32 processing stages, each of said 32 processing stages capable of performing one of a plurality of execution steps associated with a pending instruction being executed by said instruction execution pipeline, wherein at least one of said 32 processing stages comprises a counting circuit for determining the number of Logic 1 bits in one of a 32-bit data bus and a 32-bit register in said data processor, said counting circuit comprising:

an input stage comprising eight 4:3 carry-save adders, each of said 4:3 carry-save adders receiving four of said 32 data bits on four input lines and generating three sum bits (S2, S1, S0) equal to a total number of Logic 1 bits on said four input lines, wherein said three sum bits have bit weights of S2=4, S1=2 and S0=1, respectively;

a first intermediate stage of 4:2 carry-save adders, each of said first intermediate stage 4:2 carry-save adders having four input lines for receiving selected ones of said S2 sum bits, said S1 sum bits, and said S0 sum bits and generating therefrom a carry-out (COUT) bit, a carry (C) bit and a sum (S) bit;

a second intermediate stage of 4:2 carry-save adders, each of said second intermediate stage 4:2 carry-save adders having four input lines for receiving selected ones of said COUT bits, said C-bits, and said S-bits from said first intermediate stage 4:2 carry-save adders; and a carry-propagate adder having a first input channel and a second input channel coupled to said second intermediate stage 4:2 carry-save adders and capable of generating a binary result equal to a total number of Logic 1 bits in said group of 32 data bits.

* * * * *